United States Patent
Roh (10) Patent No.: US 6,408,964 B1
(45) Date of Patent: Jun. 25, 2002

(54) WHEEL AND TRACK DRIVING EQUIPMENT

(76) Inventor: Su-Eub Roh, Doo San Apt. 106-1003, Um Sa-Li, Doo Ma-Myon, Mon San-City, Chung Choung Nam-Do 320-195 (KR)

(*) Notice: Subject to any disclaimer, the term of this patent is extended or adjusted under 35 U.S.C. 154(b) by 0 days.

(21) Appl. No.: 09/732,753

(22) Filed: Dec. 11, 2000

(30) Foreign Application Priority Data

Dec. 13, 1999 (KR) .............................................. 99-57198

(51) Int. Cl.$^7$ .............................................. B62D 55/02

(52) U.S. Cl. ..................................................... 180/9.34

(58) Field of Search ................................ 180/9.1, 9.21, 180/9.26, 9.28, 9.3, 9.34, 9.36

(56) References Cited

U.S. PATENT DOCUMENTS

| | | | |
|---|---|---|---|
| 3,346,062 A | * 10/1967 | Richison et al. | 180/6.7 |
| 3,417,832 A | * 12/1968 | Ziccardi | 180/9.3 |
| 4,687,068 A | * 8/1987 | Pagett | 180/8.2 |
| 4,977,971 A | * 12/1990 | Crane et al. | 180/8.3 |

* cited by examiner

Primary Examiner—Kevin Hurley
(74) Attorney, Agent, or Firm—Burns, Doane, Swecker & Mathis, L.L.P.

(57) ABSTRACT

Disclosed is wheel and track equipment in which the running components (e.g., wheels) only used in normal vehicles are incorporated with those (e.g., tracks) used in special-purpose vehicles to provide a selective driving relationship and thereby enable a wide driving performance regardless of the type of the vehicle or the condition of the road surface. The wheel and track driving equipment also includes a link connection having a multi-bending structure provided between a pair of wheel and track to have a seesaw effect of up-and-down motion in the symmetric structure, thereby readily overcoming the obstructions and running the vehicle on the rough road surface such as rugged ground and stairway. More specifically, wheel and track driving equipment includes a front wheel driving section and a rear wheel driving provided at the rear of the front wheel driving section, wherein the front wheel driving section includes: a first running unit including an integral group of a wheel and a track wheel; a second running unit including an integral group a wheel, a front drive gear and a track wheel; a pair of connections including a track and a front link connection between the first running unit and the second running unit; and a buffer unit, wherein the rear wheel driving section includes: a third running unit including an integral group of a wheel and a track wheel; a fourth running unit including an integral group of a wheel and a track wheel; a fifth running unit including an integral group of a wheel, a rear drive gear and a track wheel; a pair of connections including the track and a rear link connection between the third and fourth running units and the fifth running unit; and a damper.

4 Claims, 6 Drawing Sheets

Prior Art

Prior Art

WHEEL AND TRACK DRIVING EQUIPMENT

BACKGROUND OF THE INVENTION

1. Field of the Invention

The present invention relates to wheel and track driving equipment and, more particularly, to wheel and track driving equipment in which wheels for general-purpose vehicles are used in combination with tracks for special-purpose vehicles (e.g., military and other various industrial use-purpose vehicles) to provide a selective driving performance, thus making it possible to drive the vehicle regardless of the condition of the road surface and to use the wheel and track driving equipment in both general vehicles and special-purpose vehicles.

2. Description of the Related Art

The general driving equipments for various vehicles are divided into wheel driving equipment and track driving equipment. The former is widely used in general vehicles such as normal motorcars and the latter is used in special-purpose vehicles, including military combat vehicles and various industrial vehicles (e.g., excavators).

Figure 1:
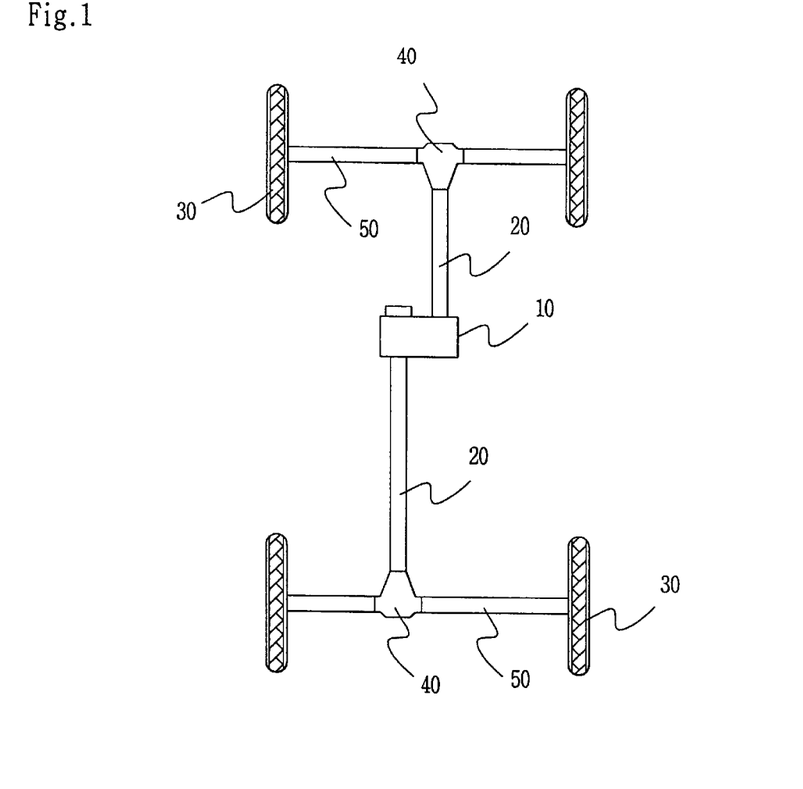
FIG. 1 is a schematic view of conventional wheel driving equipment.

The wheel driving equipment includes, as illustrated in FIG. 1 (for 4-wheel drive vehicles), a transfer machine 10 receiving the engine driving force, propeller shafts 20 provided at the front and rear of the transfer machine 10, respectively, four wheels receiving the torque from the propeller shafts 20, a differential gear 40, and a driver shaft 50.

In operating the vehicle, the wheel driving equipment provides comfort and high speed driving only on the road surface in good condition and hardly performs the driving performance with serious problems in regard to the safety on the rough road surface such as rugged mountainous trail, obstructive trail (e.g., stairway), snowy trail or desert. Thus the vehicle with the wheel driving equipment may slip on the road and, for the worse, overturn on the rough road surface. Due to lack of stability and hill climbing ability, the vehicle encounters a serious problem on the marsh or obstructive road and has to request for external help without overcoming difficulties.

Figure 2:
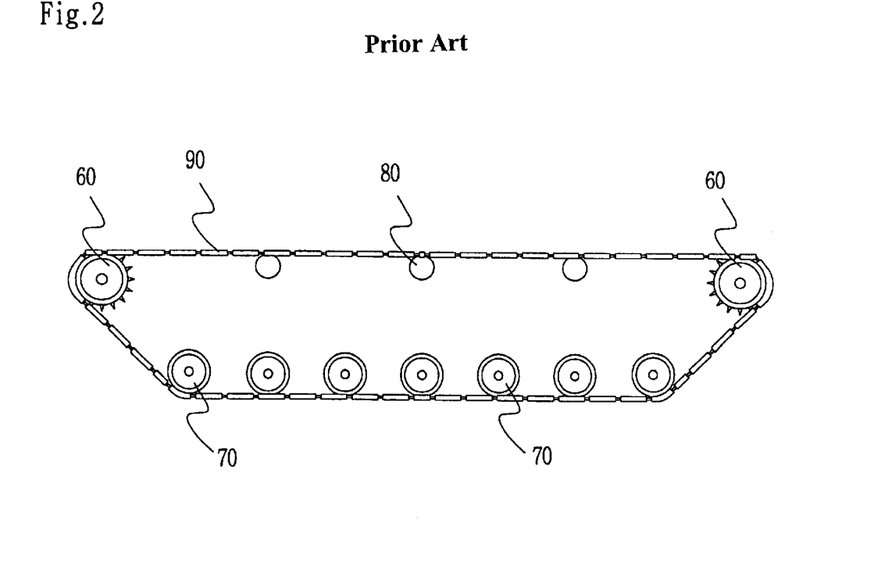
FIG. 2 is a schematic view of conventional track driving equipment.

The track driving equipment includes, as shown in FIG. 2, starting wheels 60 for transferring the power to the front part of the vehicle, a plurality of bogie wheels 70 and support wheels 80 provided on the inside bottom and top of the starting wheels 60, and a band-shaped shaped track O with guide pins P winding the outside surface of the starting wheels 60.

In operating the vehicle, the track driving equipment may have a good driving performance even on the rough road surface such as rugged mountainous trail or plain owing to its relatively low grounding voltage and strong tractive force but requires considerable power consumption because of its structural feature of driving the track. The track driving equipment also has a problem in regard to the deterioration of ride comfort under the driving noise and vibrations of the tracks in friction with the road surface, as well as off tracking. Such noises and vibrations may cause another problem that disables the high speed running of the vehicle.

The above-described conventional wheel or track driving equipments are limited in their use to either general vehicles or special-purpose vehicles. There is thus a need of wheel and track driving equipment having a general-purpose driving performance irrespective of the condition of the road surface.

SUMMARY OF THE INVENTION

It is, therefore, an object of the present invention to solve the overall problems with the conventional driving equipments and to provide wheel and track driving equipment in which the running components (e.g., wheels) only used in normal vehicles are incorporated with those (e.g., tracks) used in special-purpose vehicles to provide a selective driving relationship and thereby enable a wide driving performance regardless of the type of the vehicle or the condition of the road surface.

It is another object of the present invention to provide wheel and track driving equipment in which a link connection having a multi-bending structure is provided between a pair of wheel and track to provide a seesaw effect of up-and-down motion in the symmetric structure, thereby readily overcoming the obstructions and running the vehicle on the rough road surface such as rugged ground and stairway.

To achieve the objects of the present invention, there is provided wheel and track driving equipment including a front wheel driving section and a rear wheel driving section provided at the rear of the front wheel driving section, wherein the front wheel driving section includes: a first running unit including an integral group of a wheel and a track wheel; a second running unit including an integral group of a wheel, a front drive gear and a track wheel; a pair of connections including a track and a front link connection between the first running unit and the second running unit; and a buffer unit, wherein the rear wheel driving section includes: a third running unit including an integral group of a wheel and a track wheel; a fourth running unit including an integral group of a wheel and a track wheel; a fifth running unit including an integral group of a wheel, a rear drive gear and a track wheel; a pair of connections including the track and a rear link connection between the third and fourth running units and the fifth running unit; and a buffer unit(e.g., torsion bar).

DETAILED DESCRIPTION OF THE PREFERRED EMBODIMENT

Hereinafter, the preferred embodiments of wheel and track driving equipment according to the present invention will be described in detail with reference to the accompanying drawings.

Figure 3:
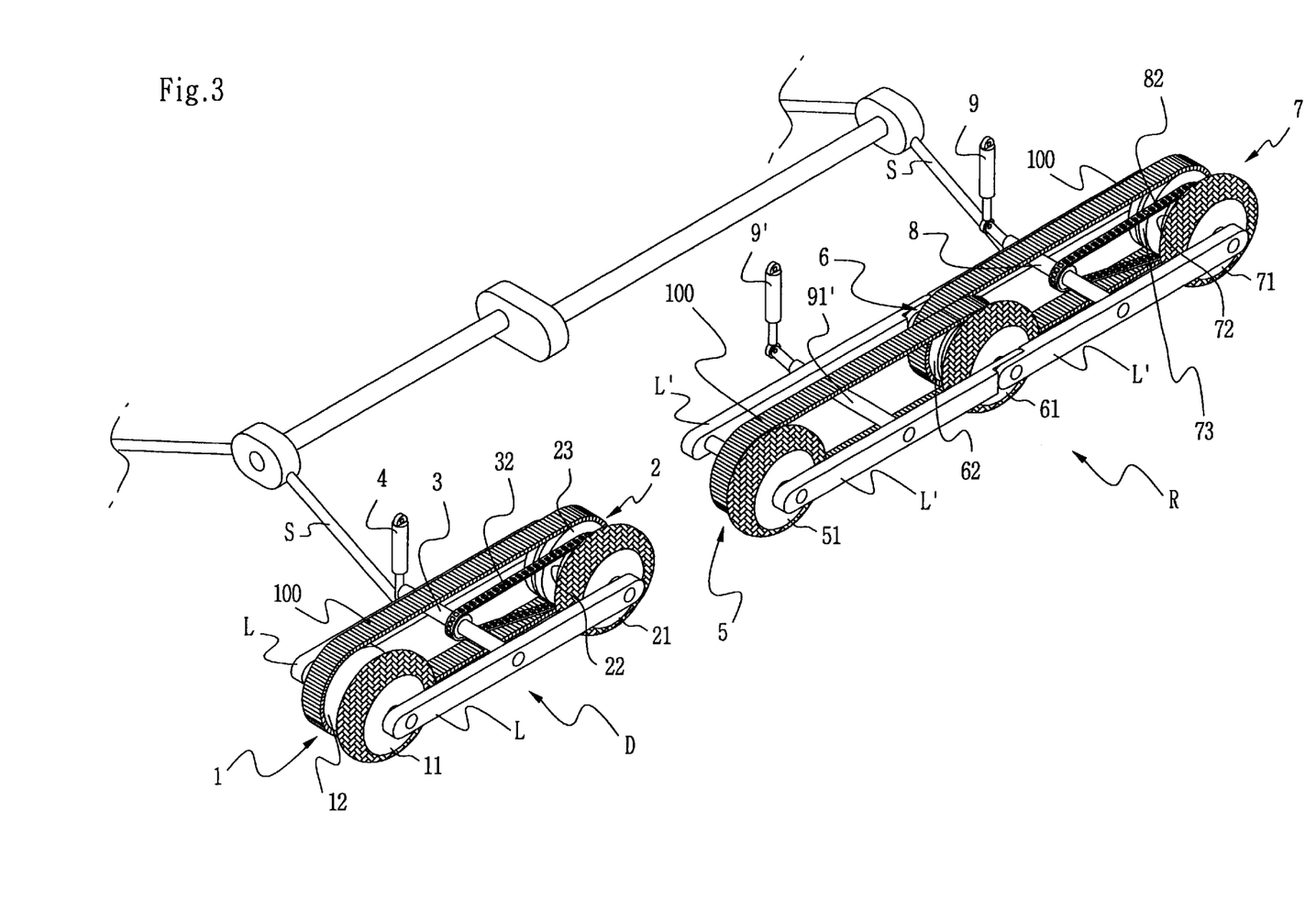
FIG. 3 is a partial perspective view of wheel and track driving equipment according to the present invention.
Figure 4:
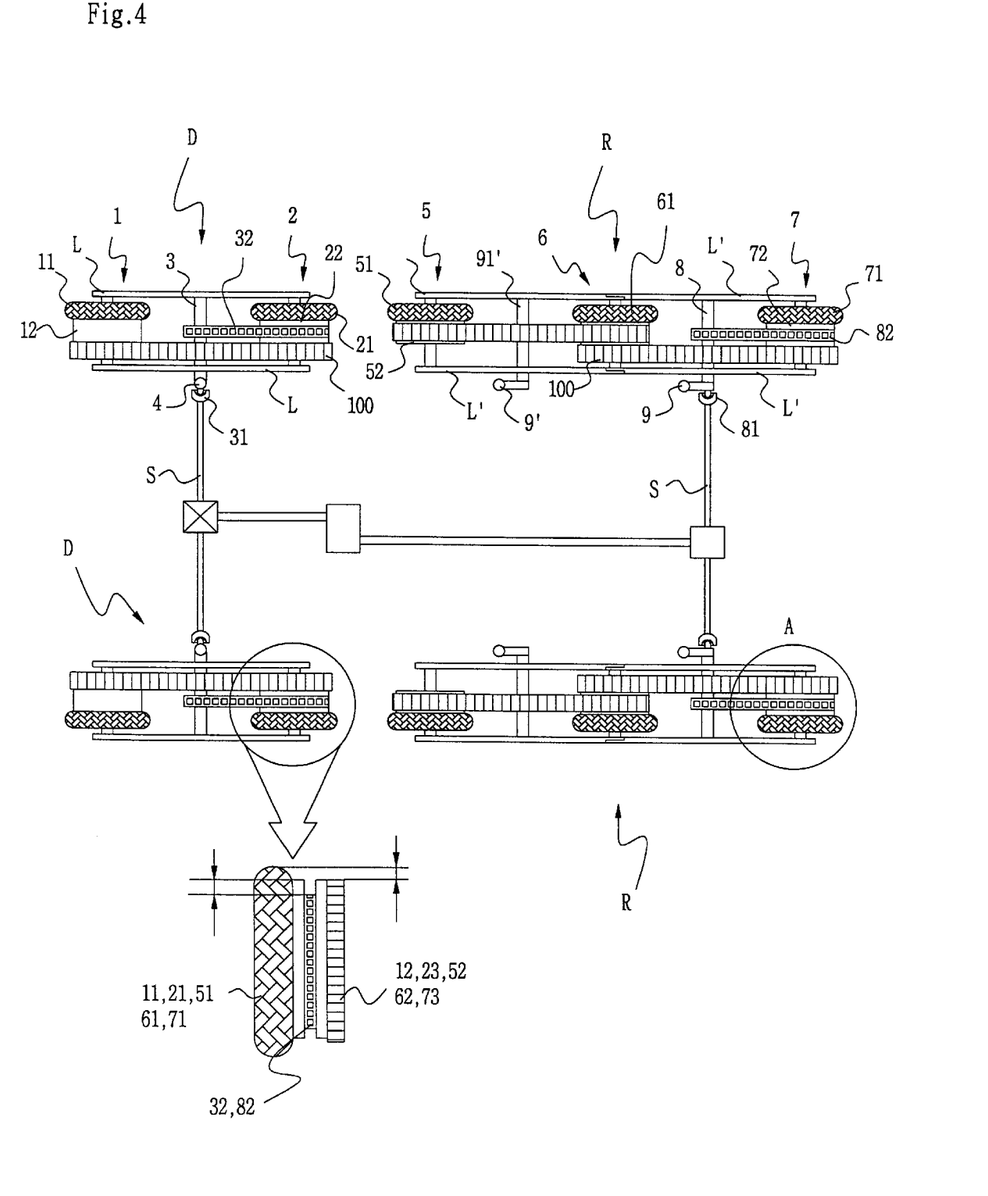
FIG. 4 is a plan schematic view of the wheel and track driving equipment according to the present invention.
Figure 5:
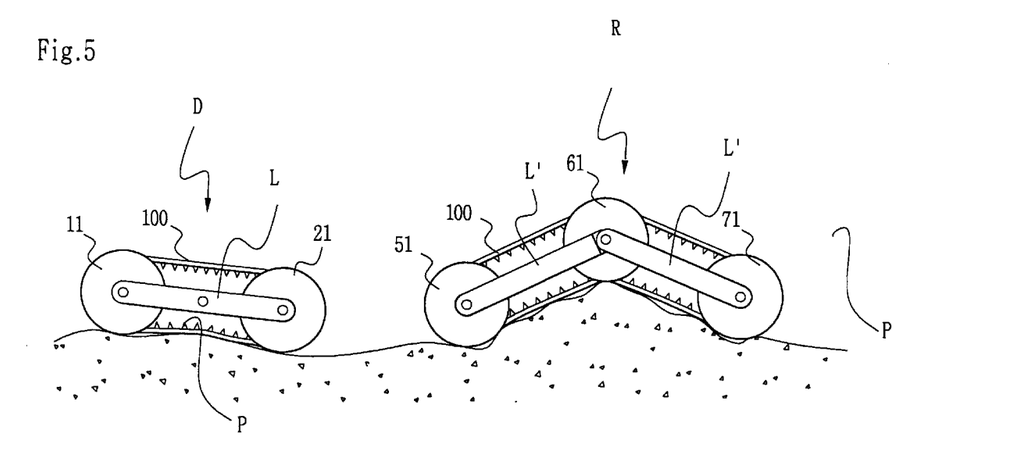
FIGS. 5 and 5a show the operating status of the wheel and track driving equipment according to the present invention.
Figure 5A:
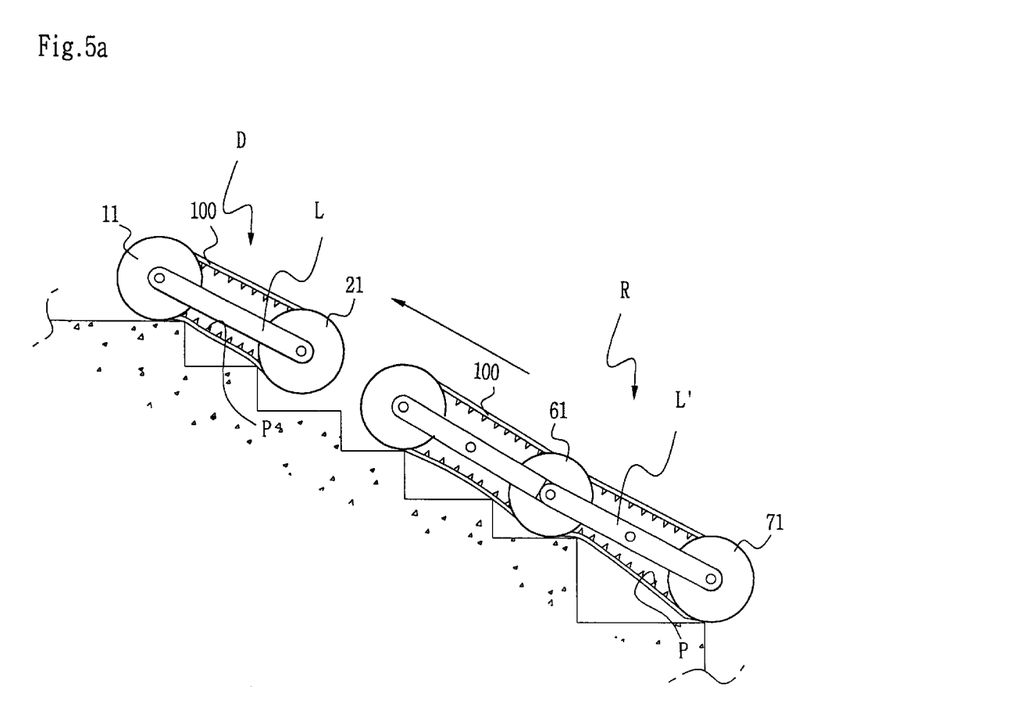
Figure 6:
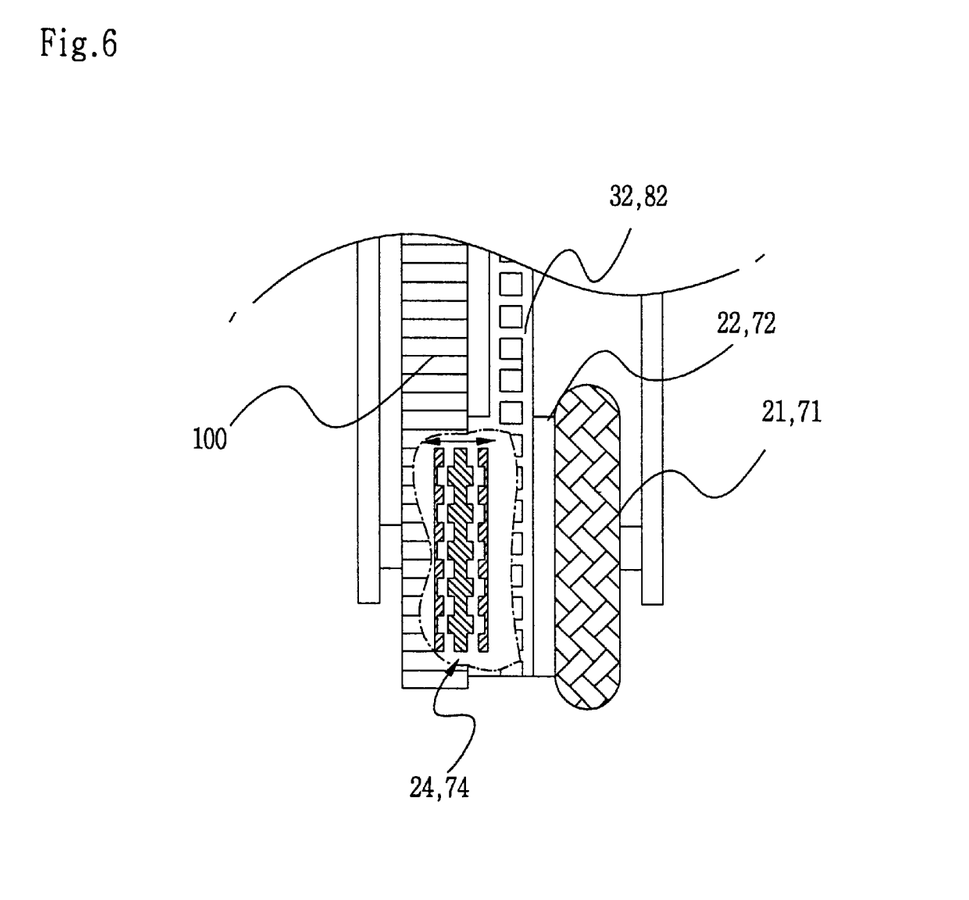
FIG. 6 is a schematic view of a clutch in part A of FIG. 4.

FIG. 3 is a partial perspective view of wheel and track driving equipment according to the present invention, and FIG. 4 is a plan schematic view of the wheel and track driving equipment according to the present invention. FIGS. 5 and 5a show the operating status of the wheel and track driving equipment according to the present invention. FIG. 6 is a schematic view of a clutch in part A of FIG. 4.

In the figures, the wheel and track driving equipment comprises a front wheel driving section D and a rear wheel driving section R. The front wheel driving section D includes an assembly comprising a first running unit 1, a second running unit 2, front link connections L, a front power shaft 3 and a buffer unit 4. The rear wheel driving section R includes an assembly comprising a third running unit 5, a fourth running unit 6, a fifth running unit 7, rear link connections L', a rear power shaft 8 and a buffer unit 9 be attached damper.

The first running unit 1 of the front wheel driving section D includes, as shown in FIG. 3 or 4, an integral group of wheel 11 and track wheel 12. The wheel 11 is positioned outside and the track wheel 12 is inside and opposite to the wheel 11. The wheel 11 and the track wheel 12 are interconnected via a sliding connection such as bearing (not shown) to have the free rotating relationship with each other. Preferably, the diameter (size) of the track wheel 12 is smaller than that of the wheel 11 by a length l, as shown in the enlarged part of FIG. 4.

The second running unit 2 of the front wheel driving section D includes, as shown in FIG. 3, an integral group of wheel 21, front drive gear 22 and track wheel 23. The wheel 21 is positioned outside and the track wheel 23 is inside and opposite to the wheel 21. Between the wheel 21 and the track wheel 23 is positioned the front drive gear 22. Preferably, the diameter (size) of the track wheel 23 is relatively smaller than that wheel 21 and larger than that of the front drive gear 22 by a length l', as shown in the enlarged part of FIG. 4.

More preferably, the second running unit 2, which receives the engine driving force, has a built-in clutch 24 as shown in FIG. 6 so as to intermit the engine driving force and thereby selectively drive the wheel 21 or the track wheel 23.

The front link connections L of the front wheel driving section D connect the first driving unit 1 to the second driving unit 2. The front link connections L have a structure comprising a pair of joints, which are capable of making a free bending motion as shown in FIG. 3 or 4 and connecting the inside and outside of the first and second running units 1 and 2 in the symmetric relationship.

The front power shaft 3 of the front wheel driving section D is, as shown in FIG. 4, a power transmission unit connected to an engine driving shaft S by a joint 31. Preferably, the front power shaft 3 has a transverse structure for fixing a pair of the front link connections L as shown in FIG. 3 or 4 and is centrally provided with a power connection 32 such as chain.

The buffer unit 4 of the front wheel driving section D mitigates the running shock in connection with the front power shaft 3. Preferably, the buffer unit 4 is selectively provided with a composite hydraulic suspended device widely used in the field of the general industry, such as shock absorber, gas spring or buffer spring.

The third running unit 5 of the rear wheel driving section R includes, as shown in FIG. 3 of 4, an integral group of wheel 51 and track wheel 52. The wheel 51 is positioned outside and the track wheel 52 is inside and opposite to the wheel 51. The wheel 51 and the track wheel 52 are interconnected via a sliding connection such as bearing (not shown) to have the free rotating relationship with each other. Preferably, the diameter (size) of the track wheel 52 is smaller than that of the wheel 51 by length l, as described in regard to the first running unit.

The fourth running unit 6 of the rear wheel driving section R includes, as described in regard to the third running unit 5, an integral group of wheel 61 and track wheel 62. The wheel 61 is positioned outside and the track wheel 62 is inside and opposite to the wheel 61. The wheel 61 and the track wheel 62 are interconnected via a sliding connection such as bearing (not shown) to have the free rotating relationship with each other. In particular, as shown in FIG. 3 and described later, the fourth running unit 6 acts as an intermediate that interconnects tracks 100 of the running units 5 and 7. For that reason, pluralities of track wheels 62 are preferably provided as shown in FIG. 3 or 4.

The fifth running unit 7 of the rear wheel driving section R includes, as shown in FIG. 3 an integral group of wheel 71, rear drive gear 72 and track wheel 73. The wheel 71 is positioned outside and the track wheel 73 is inside and opposite to the wheel 71. Between the wheel 71 and the track wheel 73 is positioned the rear drive gear 72. The fifth running unit 7 is similar to the second running unit 2 in regard to the diameter (size) of the wheel 71, the rear drive gear 72 and the track wheel 73. Preferably, the diameter (size) of the track wheel 73 is relatively smaller than that of the wheel 71 and larger than that of the front drive gear 72, as shown in the enlarged part of FIG. 4.

More preferably, the fifth running unit 7, which receives the engine driving force, has a built-in clutch 74 as shown in FIG. 6 so as to transmit the engine driving force and thereby selectively drive the wheel 71 and the track wheel 73. Such a structure of the fifth running unit 7 is similar to that of the second running unit 2 of the front wheel driving section D.

The rear link connection L' of the rear wheel driving section R connect the third running unit 5, the fourth running unit 6 and the fifth running unit 7. The rear link connections L' also have a structure comprising a pair of joints, which are capable of making a free bending motion as shown in FIG. 3 or 4 and connecting the inside and outside of the third, fourth and fifth running units 5,6 and 7 in the symmetric relationship.

The rear power shaft 8 of the rear wheel driving section R is, as shown in FIG. 4, a power transmission unit connected to an engine driving shaft S by a joint 81. Preferably, the rear power shaft 8 has a transverse structure for fixing a pair of the rear link connections L' as shown in FIG. 3 or 4 and is centrally provided with a power connection 82 such as chain. Thus, the rear power shaft 8 is similar in the structure to the front power shaft 3 of the front wheel driving section D.

The buffer unit 9 of the rear wheel driving section R mitigates the running shock in connection with the rear power shaft 8. Preferably, the buffer unit 9 is comprised of a conventional damper used in the art and a composite hydraulic suspended device widely used in the field of the general industry, such as shock absorber or torsion bar. In this regard, the buffer unit 9 is also similar in the structure to the buffer unit 4 of the front wheel driving section D. Preferably, the rear wheel driving section R is provided with a plurality of the buffer units 9, as shown in FIG. 3 or 4. The one buffer unit 9 is connected to the rear power shaft 8, and the other buffer unit 9' is connected to a fixed axis 91 and provided in the middle of the rear link connections L', which connect the third running unit 5 to the fourth running unit 6. More preferably, the lower ends of the individual buffer units have such a link connection as to properly change the clearance against the running shock and directional variations while the vehicle is running.

In assembling the individual components into the wheel and track driving equipment, as shown in FIG. 3 or 4, the first connected to the second running unit 2 via the front link connections L and the front power shaft 3 is transversely fixed in the middle of the connection between the first running unit 1 and the second running unit 2. The front power shaft 3 is connected to the front drive gear 22 via the power connection 32 and associated at the rear end with the buffer unit 4. The front power shaft 3 is then connected to the normal engine power shaft S via the joint 31, thus completing the front wheel driving section D.

The front wheel driving section D is then sequentially connected at the rear end to the first running unit 5, the fourth running unit 6 and the fifth running unit 7 via the rear link connection L'. The fixed axis 91' associated with the buffer unit 9'(damper) is transversely fixed in the middle of the connection between the third running unit 5 and the fourth running unit 6, and the rear power shaft 8 is transversely fixed in the middle of the connection between the fourth running unit 6 and the fifth running unit 7. The rear power shaft 8 is connected to the rear drive gear 72 via the power connection 82 and associated at the rear end with the buffer unit 9. The front power shaft 8 is then connected to the engine power shaft S via the joint 81, thus completing the rear wheel driving section R. Finally, the tracks 100 with guide pins P are provided between the track wheels 12 and 23 of the first and second running units 1 and 2, and the track wheels 52, 62 and 73 of the third, fourth and fifth running units have a band shape as shown in FIG. 3 or 4, thus completing the wheel and track driving equipment.

Preferably, the tracks 100 that interconnect the respective track wheels 12, 23, 52, 62 and 73 are made from a synthetic resin material containing various strengthening members such as iron core to have both flexibility and abrasion resistance.

Now, a description will be given to the operation of the above-constructed wheel and track driving equipment.

When the vehicle is running on the good road surface such as asphalt, the clutches 24 and 74 of the front and rear wheel driving sections D and R intermit the driving power as shown in FIG. 6 to drive the wheels 21 and 71 of the second and fifth running units 2 and 7, respectively. In this case, the track wheels 12, 23, 52, 62 and 73 of the front and rear wheel driving sections D and R are power-disconnected to make the vehicle run at high speed. When the vehicle is running on the rough road surface such as stairway, the clutches 24 and 74 of the front and rear wheel driving sections D and R are gear-shifted to actuate only the track wheels 12, 23, 52, 62 and 73 of the second and fifth running units 2 and 7.

In this case, the front wheel driving section D has a connection structure using the front link connections L that are capable of making a free bending motion. For that reason, the vehicle can readily run on the rough road surface such as stairway by way of the seesaw effect that the reactive running force of the track descends the second running unit 2 with the first running unit 1 ascending, and vice versa, as shown in FIG. 5. Also, the link connections L' capable of making a free bending motion allows the rear wheel driving section R to have a zigzag configuration and readily change in the up-and-down position, which facilitates the running of the vehicle on the rough road surface or on the sand.

In the above-stated wheel and track driving equipment, the wheels 11, 21, 51, 61 and 71 are different in the diameter from the track wheels 12, 23, 52, 62 and 73 by a predetermined height (length) as shown in the enlarged part of FIG. 4. This prevents the wheels 11, 21, 51, 51 and 71 form interfering with the interference of the track wheels 12, 23, 52, 62 and 73 in running at high speed on the good road surface, and makes the wheels 11, 21, 51, 61 and 71 to readily overcome the obstructions during the track running on the rough road surface. The diameter difference between the wheels 11, 21, 51, 61 and 71 and the track wheels 12, 23, 52, 62 and 73 is variable by regulating the it pressure of the wheels 11, 21, 51, 61 and 71.

Figure 7:
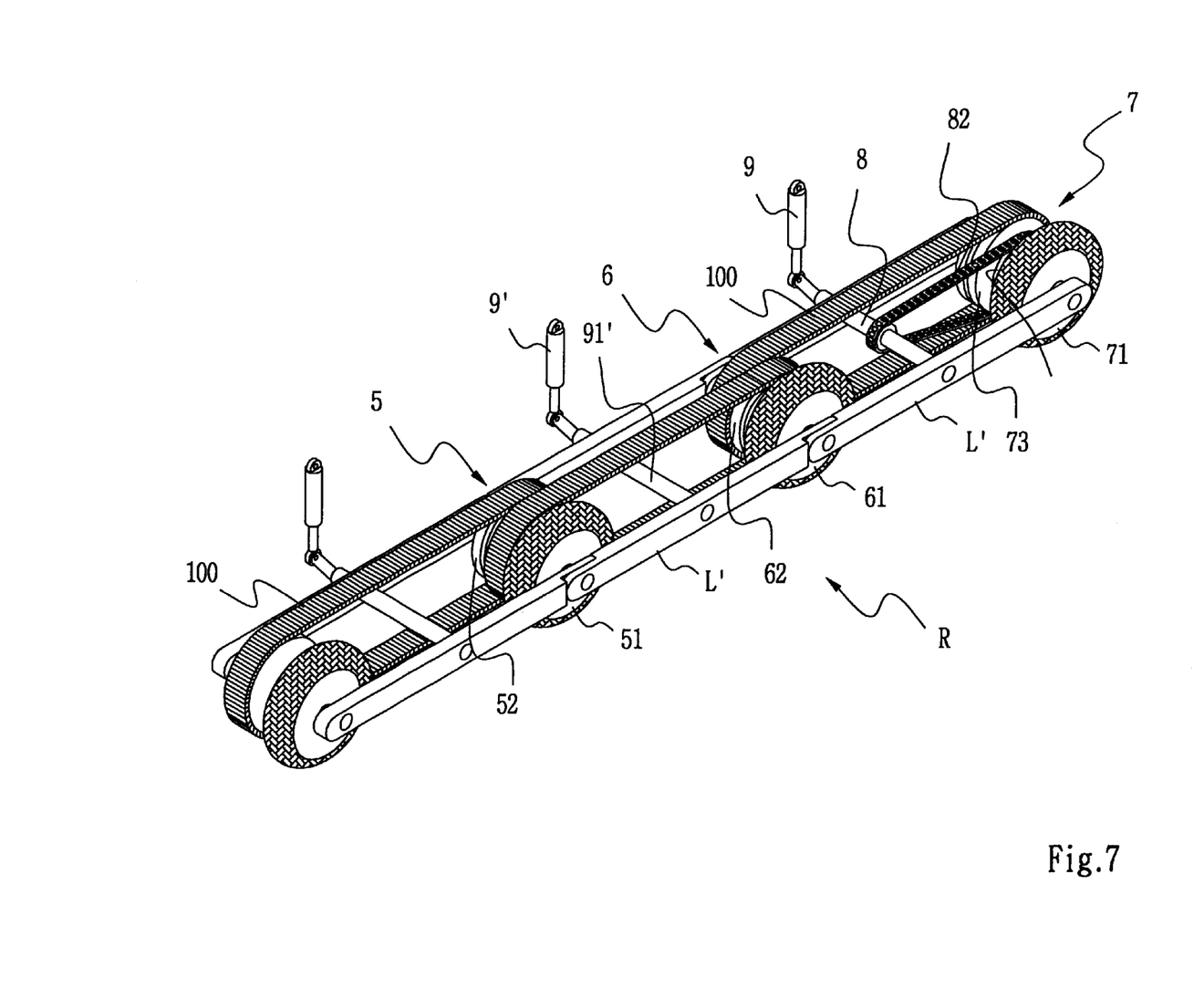
FIG. 7 is a schematic view showing another embodiment of the rear wheel driving section according to the present invention.

On the other hand, the wheel and track driving equipment as described above uses the four-wheel drive principle to transfer the driving force to the front wheel driving section D and the rear wheel driving section R. The number of the running units 5, 6 and 7 in the rear wheel driving section R is variable depending on the volume and use purpose of the vehicle, as shown in FIG. 7. Alternatively, the wheel and track driving equipment can have a single driving configuration including the components of the rear wheel driving section R without those of the front wheel driving section D.

In the wheel and track driving equipment, the clutches 24 and 74 for selectively intermitting the driving power are not used only in the second and fifth running units 2 and 7 but also selectively in the running units 1, 5 and 6 while allowing the integral gear shift.

As described above, the wheel and track driving equipment of the present invention uses a combination of wheel and track to have a selective driving relationship by way of the power intermittence with clutches, thereby enabling a wide driving performance including a high speed running on the normal road surface and a rough field running on the rough road surface, and providing a seesaw effect via the front and link connections capable of making a free bending motion to readily run the vehicle against steep obstructions such as stairway.

Furthermore, the wheel and track driving equipment can selectively switch the driving performance between wheel driving and track driving to minimize the power loss and prevent serious running noises with enhanced running stability and enable the continuous running of the vehicle even when a part of the wheels are punctured or get off form the tracking. Due to this enhanced safety in running the vehicle, the wheel and track driving equipment is expectable in the field of general vehicles and special vehicles for industrial or military use purposes.

It is to be noted that like reference numerals denote the same components in the drawings, and a detailed description of generally known function and structure of the present invention will be avoided lest it should obscure the subject matter of the present invention.

What is claimed is:

1. Wheel and track driving equipment comprising a front wheel driving section and a rear wheel driving section provided at the rear of the front wheel driving section, wherein the front wheel driving section comprises:

a first running unit including an integral group of a wheel and a track wheel;

a second running unit including an integral group of wheel, a front drive gear and a track wheel;

a pair of connections including a track and a front link connection L between the first running unit and the second running unit; and a buffer unit, wherein the rear wheel driving section comprises:

a third running unit including an integral group of a wheel and a track wheel;

a fourth running unit including an integral group of a wheel and a track wheel;

a fifth running unit including an integral group of a wheel, a rear drive gear and a track wheel;

a pair of connections including the track and a rear link connection between the third and fourth running units and the fifth running unit;

and a buffer unit.

2. The wheel and track driving equipment as claimed in claim 1, wherein clutches for intermitting the power are provided in the second running unit with the front drive gear and the fifth running unit with the rear drive gear, thus allowing a selective gear shift between wheel running and track running depending on the condition of the road surface.

3. The wheel and track equipment as claimed in claim 1, wherein the front drive gear of the second running unit is connected to a front power shaft via a power connection and the rear drive gear of the fifth running unit is connected to a rear power shaft via a power connection to receive the necessary power.

4. The wheel and track equipment as claimed in claim 1, wherein the number of the running units in the rear driving section is selectively variable depending on the size of the vehicle.

* * * * *